United States Patent
Fukutani et al.

(10) Patent No.: US 7,113,368 B2
(45) Date of Patent: Sep. 26, 2006

(54) RECORDING AND REPRODUCING APPARATUS FOR PREVENTING ERRONEOUS ERASURE

(75) Inventors: Takahiro Fukutani, Kanagawa (JP); Nobuaki Baba, Tokyo (JP); Minoru Ootsuka, Tokyo (JP); Katsuya Kamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/511,667

(22) PCT Filed: Apr. 16, 2003

(86) PCT No.: PCT/JP03/04850

§ 371 (c)(1),
(2), (4) Date: Jun. 13, 2005

(87) PCT Pub. No.: WO03/090223

PCT Pub. Date: Oct. 30, 2003

(65) Prior Publication Data

US 2005/0237647 A1    Oct. 27, 2005

(30) Foreign Application Priority Data

Apr. 19, 2002 (JP) .............................. 2002-118031

(51) Int. Cl.
G11B 15/04 (2006.01)
G11B 23/04 (2006.01)

(52) U.S. Cl. .................. 360/132; 360/96.5; 360/60

(58) Field of Classification Search ............. None
See application file for complete search history.

(56) References Cited

U.S. PATENT DOCUMENTS

| | | | |
|---|---|---|---|
| 5,091,901 A | * | 2/1992 | Yamamoto et al. ......... 720/729 |
| 5,506,736 A | * | 4/1996 | Ota ............................ 360/94 |
| 5,786,967 A | * | 7/1998 | Gerfast et al. .............. 360/132 |
| 6,227,477 B1 | * | 5/2001 | Komatsuzaki et al. ...... 242/338 |
| 6,239,950 B1 | * | 5/2001 | Uwabo et al. .............. 360/133 |
| 2005/0117881 A1 | * | 6/2005 | Baba et al. .................. 386/94 |

FOREIGN PATENT DOCUMENTS

| | | |
|---|---|---|
| EP | 0 694 920 | 1/1996 |
| EP | 0 926 674 | 6/1999 |
| JP | 6-36451 | 2/1994 |
| JP | 6-267233 | 9/1994 |
| JP | 8-45234 | 2/1996 |
| JP | 11-185441 | 7/1999 |

* cited by examiner

*Primary Examiner*—Jefferson Evans
(74) *Attorney, Agent, or Firm*—Frommer Lawrence & Haug LLP; William S. Frommer; Thomas F. Presson

(57) ABSTRACT

A recording and reproducing apparatus is provided in which recording and reproducing are performed with respect to an existing format cassette having an existing erroneous erasure prevention switch for preventing erroneous erasure of data recorded with the existing format and a new format cassette having a first erroneous erasure prevention switch located at a position corresponding to the position of the existing erroneous erasure prevention switch and having a second erroneous erasure prevention switch for preventing erroneous erasure of data recorded with a new format; wherein at the time of reproduction whether it is the existing format cassette or the new format cassette is judged based on data obtained from the reproduction of the existing format and new format cassettes to reproduce the cassette. Hereupon, in the new format cassette, the first erroneous erasure prevention means is always kept in a state of preventing the erroneous erasure.

6 Claims, 13 Drawing Sheets

Higher Cassette

Existing Cassette

High Band 8mm Video Cassette

New Format (Higher)

Existing Format (Lower)

Higher Cassette

Existing Cassette

Higher Cassette

Existing Cassette

Higher Cassette

Existing Cassette

RECORDING AND REPRODUCING APPARATUS FOR PREVENTING ERRONEOUS ERASURE

TECHNICAL FIELD

The present invention relates to a recording and reproducing apparatus capable of performing recording on and/or reproduction from an existing format cassette and a new format cassette and to a recording medium cassette used in the recording and reproducing apparatus.

BACKGROUND ART

A hole referred to so-called an ID hole is provided in a casing of a video tape cassette and the like. The hole is used to prevent erroneous erasure of data recorded on a magnetic tape or to identify a recorded format, a material of a magnetic substance of a tape and the like.

For example, as shown in an example of a relevant part of a high band 8 mm video tape cassette of FIGS. 1A and 1B, an erroneous erasure prevention member 103 capable of sliding in the longitudinal direction on the side surface 100a is provided at a position adjacent to a corner inside a casing of a cassette 100 formed by combining top and bottom shells (not shown in the figures) and an erroneous erasure prevention hole 101 functioning as the ID hole provided on the bottom surface of the cassette casing is opened and closed by moving the erroneous erasure prevention member 103.

An example of the erroneous erasure prevention member 103 has such a structure as a stepped shape formed of a plurality of bending portions as shown in FIG. 2, for example, and includes a lug portion 103a used for the moving operation, a half-disc shaped protruding portion 103b which opens and closes the erroneous erasure prevention hole 101 and an identification display portion 103c to recognize visually through an display window 102 opened in the side surface 100a of the cassette casing.

As shown in FIG. 1A, the erroneous erasure prevention member 103 is moved by laying a finger or the like on the lug portion 103a projecting from the inside of the display window 102 on the side surface 10a of the cassette casing so that the display portion 103c becomes visible in the whole display window 102. At this time, the protruding portion 103b of the erroneous erasure prevention member 103 closes the erroneous erasure prevention hole 101 to become a closed state. A position of the erroneous erasure prevention member 103 at this time is the position where the cassette is in a recordable state (REC position).

Next, as shown in FIG. 1B, the erroneous erasure prevention member 103 is moved by laying a nail on the lug portion 103a projecting from the inside of the display window 102 in the side surface 100a of the cassette casing so that the display portion 103c disappears from the display window 102 and a recording prohibition display panel 102a disposed behind becomes visible. At this time, the protruding portion 103b of the erroneous erasure prevention member 103, which has closed the erroneous erasure prevention hole 101, moves so that the erroneous erasure prevention hole 101 becomes an open state. A position of the erroneous erasure prevention member 103 at this time is the position where the cassette is in an non-recordable state (SAVE position).

Specifically, a detection hole is made to be the closed state at the recordable position and the detection hole is made to be the open state at the non-recordable position; that is, in a casing of a VHS video cassette or the like, for example, a nail has conventionally been provided for this hole when it is in a state of a blank cassette having nothing recorded yet and after recording, the nail is removed so that an existing record can not be deleted thereafter by erroneously making a duplicated recording; and hereupon this nail is made to be a movable one using the above described erroneous erasure prevention member, so that a state of nail-broken or nail-unbroken can be changed according to a necessity.

Further, though a mechanical switch is conventionally used in order to detect the state of nail-broken or nail-unbroken, it is also possible to use a photo-sensor or the like for the detection by irradiating light from below, and also it can be considered to have a construction in which the detection hole is made to be a through hole which pierces from the top surface to the bottom surface of the cassette and light is applied from one side of the through hole to be sensed on the other side thereof.

Conventionally, when magnetic recording of a different kind of format is performed on a cassette having the same shape in a recording and reproducing apparatus such as a VTR (Video Tape Recorder) for example, it is necessary to have detecting switches for identifying the format and for preventing the erroneous erasure. Conventionally, holes for the purpose of the ID hole as described above are provided according to a required number in a casing of a cassette when a format is decided, and those are judged by detecting an open or closed state of the ID holes using the detecting switches in a drive unit of the VTR provided at positions corresponding to those ID holes.

For example, a high band 8 mm video has an erroneous erasure prevention detecting switch of a cassette. FIG. 3A schematically shows an erroneous erasure prevention hole and an erroneous erasure prevention detecting switch of a high band 8 mm video tape cassette. The erroneous erasure prevention of the cassette is identified using an erroneous erasure prevention detecting switch 107, and the erroneous erasure prevention hole 101 becomes an open or closed state depending on a position of the erroneous erasure prevention member 103 which is visible from the display window 102, and thereby, it is judged whether the cassette is in a recordable state or in a non-recordable state. Moreover, in a 8 mm video, a detection hole not shown in the figure is provided for identifying either a normal 8 mm video tape cassette or a high band 8 mm video tape cassette, so that it is judged whether it is a normal one or a high band one.

On the other hand, when a higher format cassette which has been used for NTSC as a television broadcasting method, for example, is used in a new (higher) format such as, for example, a high vision, it becomes impossible to perform recording and/or reproduction in a conventional VTR due to a magnetic head and a signal processing circuit, since a magnetic tape which is a recording medium is made to be one having higher performance to record greater amount of data. For this reason, it is necessary to make the new format cassette not to be capable of recording in a conventional VTR. Following two methods can be considered for the purpose.

1. A Method of Changing a Cassette Size

A new product model is made to be capable of loading a new (higher) format only, or otherwise, it is necessary to have a complicated mechanism of higher/existing format compatible.

2. A method of Adding Another Detection Hole used for a Detecting Switch

It is necessary to keep an erroneous erasure prevention detecting switch for an existing format always turned off in a cassette for a higher format so that recording can not be performed with the existing format. Therefore, it becomes necessary to add two detection holes for detecting switches both for the purpose of identifying the higher/existing format and for the purpose of detecting the erroneous erasure prevention of the higher format cassette.

When a higher format supporting cassette shown in FIG. 4A is used, the erroneous erasure prevention hole 101 of an existing format supporting cassette is continuously kept in the open state and the erroneous erasure prevention detecting switch 107 of the existing format is turned off to prevent the erroneous erasure with the existing format.

When a higher cassette 110 is loaded into a VTR 120, a higher/existing format identification switch 122 is engaged with a higher/existing format identification hole 112 to be turned off as shown in FIG. 4A. Then, it is judged that the cassette is the higher cassette, and also, a higher format erroneous erasure prevention detecting switch 123 is turned on by an erroneous erasure prevention member 115 to become a recordable state.

Further, when the erroneous erasure prevention member 115 is moved to make a hole 113 for erroneous erasure prevention of the higher format become the open state, the higher format erroneous erasure prevention detecting switch 123 is turned off to become a non-recordable state as shown in FIG. 4B.

On the other hand, when an existing format supporting cassette shown in FIG. 5A is loaded, since there is no erroneous erasure prevention hole of higher format, the higher format erroneous erasure prevention detecting switch 123 is always turned on due to being depressed by a casing of a cassette 130 to prevent the erroneous erasure with the higher format.

When the existing cassette 130 is loaded into the VTR 120, the higher/existing format identification switch 122 is depressed by the cassette casing to be turned on as shown in FIG. 5A. Then, it is identified that the cassette is the existing cassette, and also, an existing erroneous erasure prevention detecting switch 131 is turned on by an erroneous erasure prevention member 133 to become a recordable state.

Further, when the erroneous erasure prevention member 133 is moved to make the existing erroneous erasure prevention hole 107 become the open state, the existing erroneous erasure prevention detecting switch 131 is turned off to become a non-recordable state as shown in FIG. 5B.

However, since a reduction in size and in weight with respect to, for example, a recording and reproducing apparatus such as the VTR has been advancing year by year, there has been a problem in which when the above described two detecting switches are to be added, a space for new detecting switches may not be secured in the drive unit of an existing recording and reproducing apparatus and it is not possible to use an existing drive unit.

DISCLOSURE OF THE INVENTION

Accordingly, in view of such aspect, the present invention aims to propose a recording and reproducing apparatus and a recording medium cassette which are capable of performing recording on and reproduction from an existing format and a new format cassettes by implementing a simple design change to utilize an existing cassette and an existing drive unit.

A first aspect of the present invention is a recording and reproducing apparatus that performs recording on and reproduction from both an existing format cassette having an existing erroneous erasure prevention means for preventing the erroneous erasure of data recorded with the existing format and a new format cassette having a first erroneous erasure prevention means at a position corresponding to a position of the existing erroneous erasure prevention means and also having a second erroneous erasure prevention means for preventing the erroneous erasure of data recorded with the new format, in which at a time of reproduction, the reproduction from a cassette is preformed by judging whether the cassette is of the existing format cassette or of the new format cassette based on data obtained by the reproduction from the existing and new format cassettes.

With that, the first erroneous erasure prevention means in the new format cassette is made to be always kept in a state of preventing the erroneous erasure.

Accordingly, since the identification is performed by judging whether the cassette is the existing format one or new format one based on the data obtained from the reproduction so that the reproduction of the cassette can be performed with the proper format, the existing cassette and drive unit can be utilized by adding only one piece of detecting switch to support the new format.

Further, since the existing erroneous erasure prevention means of the new cassette is kept always in the erroneous erasure prevention state, there is not such a case that the recording is performed erroneously with the existing format.

A second aspect of the present invention is that the second erroneous erasure prevention means in the first aspect of the present invention is formed of a magnetized member having a polarity to perform the erroneous erasure prevention by detecting an alteration of a magnetic field generated by this member.

Accordingly, since the erroneous erasure prevention means is formed of the magnetized member having a polarity to perform the erroneous erasure prevention by detecting the alteration of the magnetic field generated by this member, detection can be made in a non-contact manner.

A third aspect of the present invention is a recording medium cassette having an erroneous erasure prevention means, in which the erroneous erasure prevention means includes a detection hole structured to be capable of opening and closing and an display portion which displays whether the cassette is in a recordable state or in a non-recordable state; and when this detection hole is in the open state, the display portion indicates to be in the recordable state and when this detection hole is in the closed state, the display portion indicates to be in the non-recordable state.

Accordingly, when the above described structure is applied to the cassette of a new format, it is possible to perform the identification of the cassette by adding only one detection hole, utilizing the fact that the cassette at a time when the above described detection hole is in the closed state and the cassette of an existing format which does not have the detection hole are detected as if they were in the same state when they are viewed from the drive unit side and utilizing the structure of using one detection hole in common for detecting whether the cassette is of the new format or of the existing format and for preventing the erroneous erasure.

BRIEF DESCRIPTION OF DRAWINGS

FIGS. 1A and 1B are partly perspective views showing a relevant part of an existing cassette, in which FIG. 1A shows a recordable state and FIG. 1B shows a non-recordable state;

FIGS. 6A and 6B are perspective view a showing an embodiment of a recording and reproducing apparatus and a recording medium cassette according to the present invention, in which FIG. 6A shows a cassette and FIG. 6B shows a drive unit of a VTR, respectively;

FIGS. 8A and 8B are partly perspective views showing a relevant part of a higher cassette, in which FIG. 8A shows a recordable state and FIG. 8B shows a non-recordable state;

FIGS. 10A and 10B are diagrams provided for an explanation of an embodiment according to the present invention and showing open and closed states of an erroneous erasure prevention member and an erroneous erasure prevention hole in a higher cassette, in which FIG. 10A shows a recordable state and FIG. 10B shows a non-recordable state;

FIGS. 11A and 11B are diagrams provided for an explanation of an embodiment according to the present invention and showing open and closed states of an erroneous erasure prevention member and an erroneous erasure prevention hole in a higher cassette, in which FIG. 11A shows a recordable state and FIG. 11B shows a non-recordable state;

FIGS. 13A and 13B are partly perspective views showing a relevant part of a higher cassette, in which FIG. 13A shows a recordable state and FIG. 13B shows a non-recordable state;

FIGS. 14A and 14B are diagrams provided for an explanation of an embodiment according to the present invention and showing open and closed states of an erroneous erasure prevention member and an erroneous erasure prevention hole in a higher cassette, in which FIG. 14A shows a recordable state and FIG. 14B shows a non-recordable state;

FIGS. 15A and 15B are diagrams provided for an explanation of an embodiment according to the present invention and showing open and closed states of an erroneous erasure prevention member and an erroneous erasure prevention hole in a higher cassette, in which FIG. 15A shows a recordable state and FIG. 15B shows a non-recordable state;

FIGS. 16A and 16B are diagrams provided for an explanation of an embodiment according to the present invention and showing open and closed states of an erroneous erasure prevention member and an erroneous erasure prevention hole in a higher cassette, in which FIG. 16A shows a recordable state and FIG. 16B shows a non-recordable state;

FIGS. 17A and 17B are diagrams provided for an explanation of an embodiment according to the present invention and showing open and closed states of an erroneous erasure prevention member and an erroneous erasure prevention hole in a higher cassette, in which FIG. 17A shows a recordable state and FIG. 17B shows a non-recordable state;

BEST MODE FOR CARRYING OUT THE INVENTION

Figure 1A:
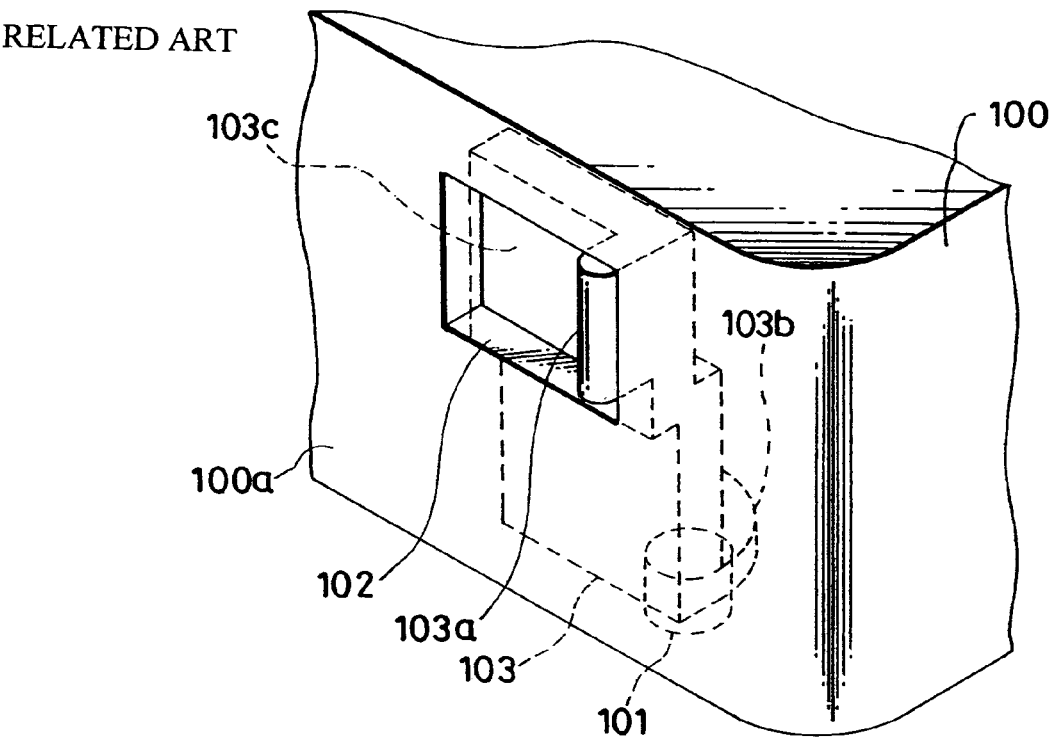
Figure 1B:
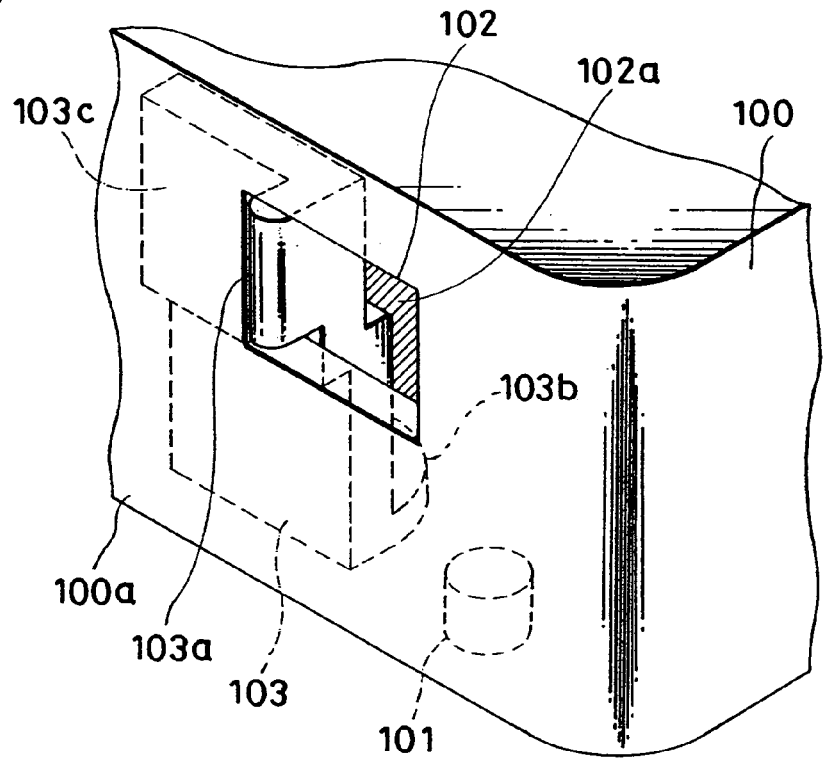
Figure 2:
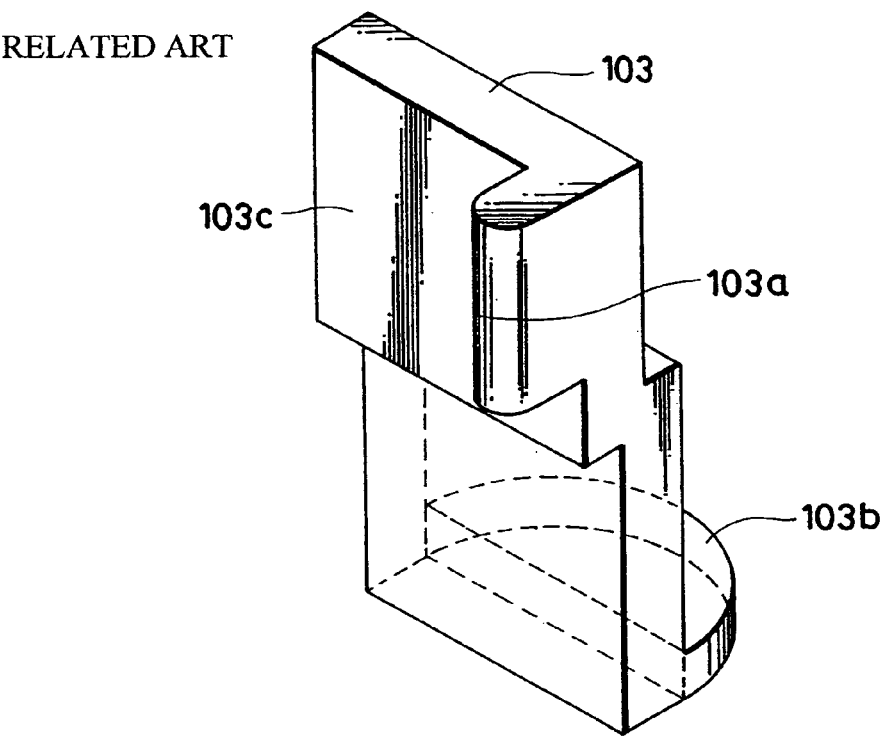
FIG. 2 is a perspective view showing an example of a conventional erroneous erasure prevention member.
Figure 3A:
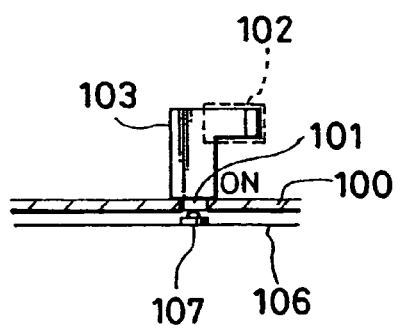
FIGS. 3A and 3B are diagrams provided for an explanation of a conventional example.
Figure 3B:
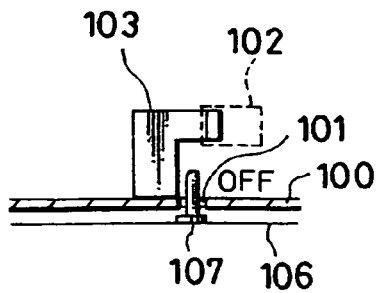
Figure 4A:
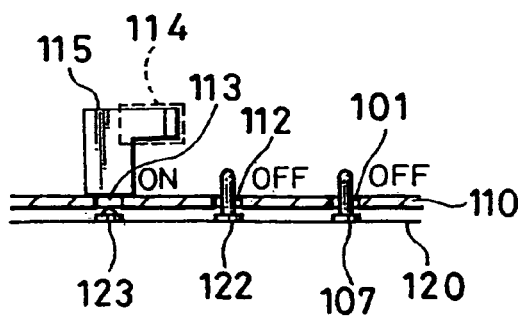
FIGS. 4A and 4B diagrams provided for an explanation of a conventional example.
Figure 4B:
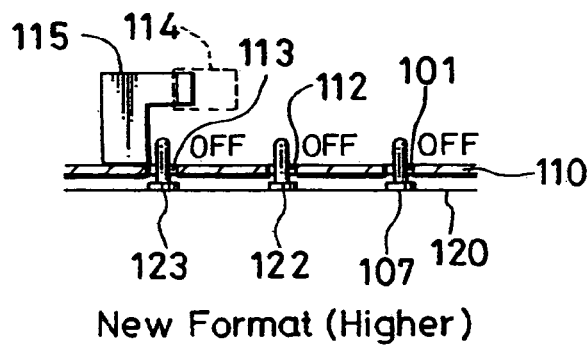
Figure 5A:
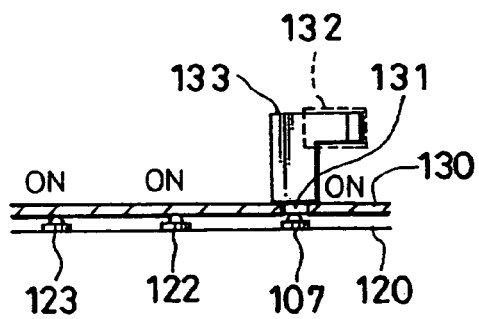
FIGS. 5A and 5B are diagrams provided for an explanation of a conventional example.
Figure 5B:
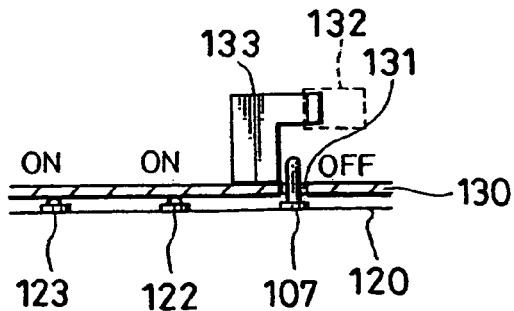

Hereinafter, an embodiment of a recording and reproducing apparatus according to the present invention is explained referring to FIGS. 6 through 12. Note that, those corresponding to the parts in FIGS. 1 through 5 shall be given the same reference numerals and a detailed explanation thereof is omitted in FIGS. 6 through 12.

As an example to which the present invention is applied, an explanation is made when an application is made, for example, to an 8 mm video cassette recorded by an NTSC method (hereinafter, referred to as "an existing cassette") and a 8 mm video cassette recorded by a high vision method (hereinafter, referred to as "a higher cassette"), and the erroneous erasure prevention and the identification are performed by an 8 mm video tape recorder (hereinafter referred to as "a VTR") which supports the high vision method. Note that, with respect to the cassette and the VTR, a description for the other portions than a main portion of the present invention is omitted.

Figure 6A:
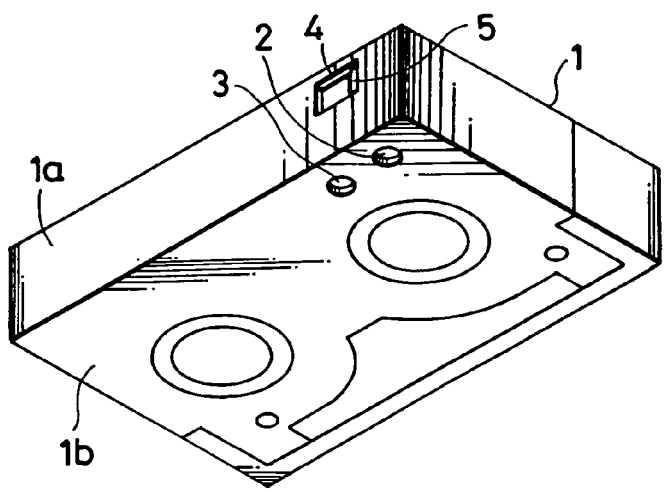

As shown in FIG. 6A, an erroneous erasure prevention member 5 is slidably provided, for example, at a position adjacent to a corner inside a cassette casing 1 formed by combining top and bottom shells (not shown in the figure), to open and close an erroneous erasure prevention hole provided on the bottom surface 1b of the cassette casing which is described later on by moving the erroneous erasure prevention member 5 in the longitudinal direction on the side surface 1a.

As the erroneous erasure prevention hole, there are provided an existing erroneous erasure prevention hole 2 in order to prevent the erroneous erasure of data recorded on a magnetic tape with the existing format and an erroneous erasure prevention hole 3 in order to prevent similarly the erroneous erasure of data recorded with the new (higher) format.

Figure 6B:
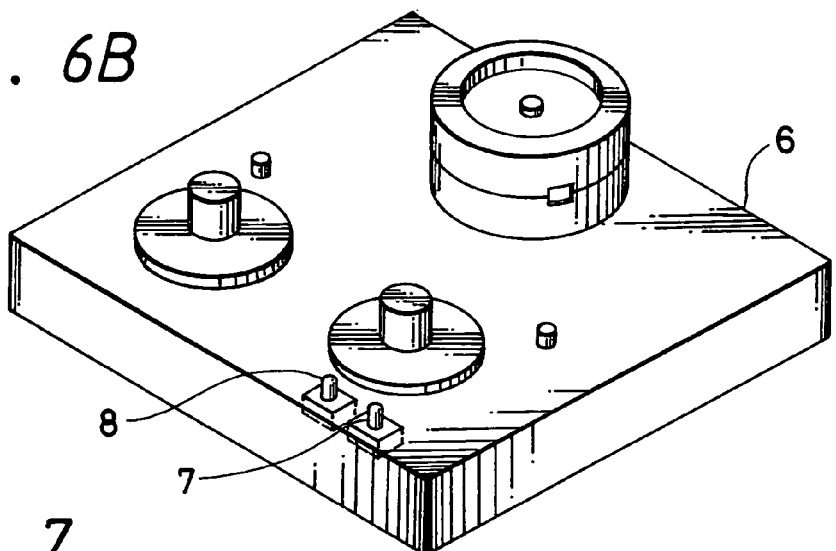

Those existing and higher erroneous erasure prevention detecting switches 7 and 8 are provided at positions respectively corresponding to positions of the above described existing erroneous erasure prevention hole 2 and higher erroneous erasure prevention hole 3 inside a corner of a drive unit shown in FIG. 6B when the cassette 1 is loaded into a VTR 6, in which each detecting switch has a detection pin; and an ON-state is detected when the detection pin is depressed by the cassette casing and an OFF-state is detected when the detection pin is not depressed due to being engaged with the erroneous erasure prevention hole, so that the open or closed state of the existing erroneous erasure prevention hole 2 and the higher erroneous erasure prevention hole 3 of the cassette 1 are detected.

It is appropriately set in advance to each cassette whether the erroneous erasure prevention is operated at the ON-state or at the OFF-state of those erroneous erasure prevention detecting switches.

Figure 7:
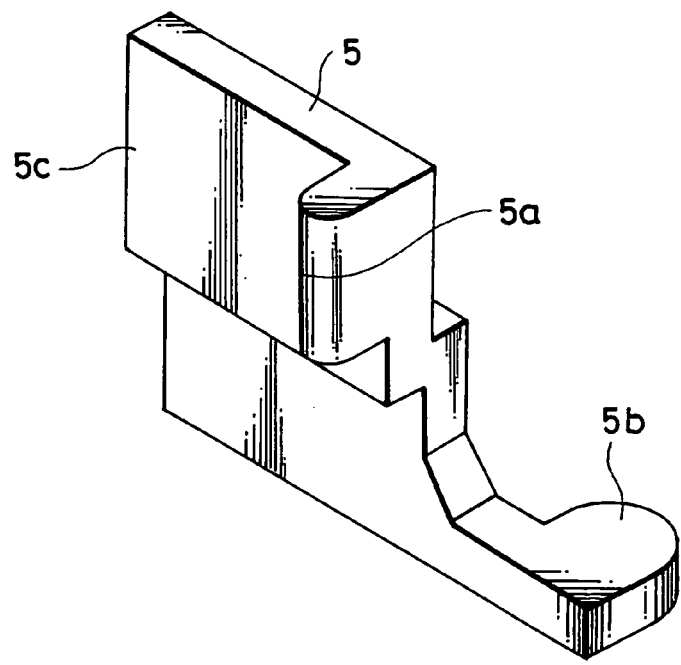
FIG. 7 is a perspective view showing an example of an erroneous erasure prevention member.

An example of the erroneous erasure prevention member 5 has a step-like shape formed of a plurality of bending portions as shown in FIG. 7 for example, and includes a lug portion 5a for moving operation, a half-disc shaped protruding portion 5b which opens and closes the erroneous erasure prevention hole and an display portion 5c which indicates to be recordable in an display window 4 provided by making an opening in the side surface 1a of the cassette casing.

Figure 8A:
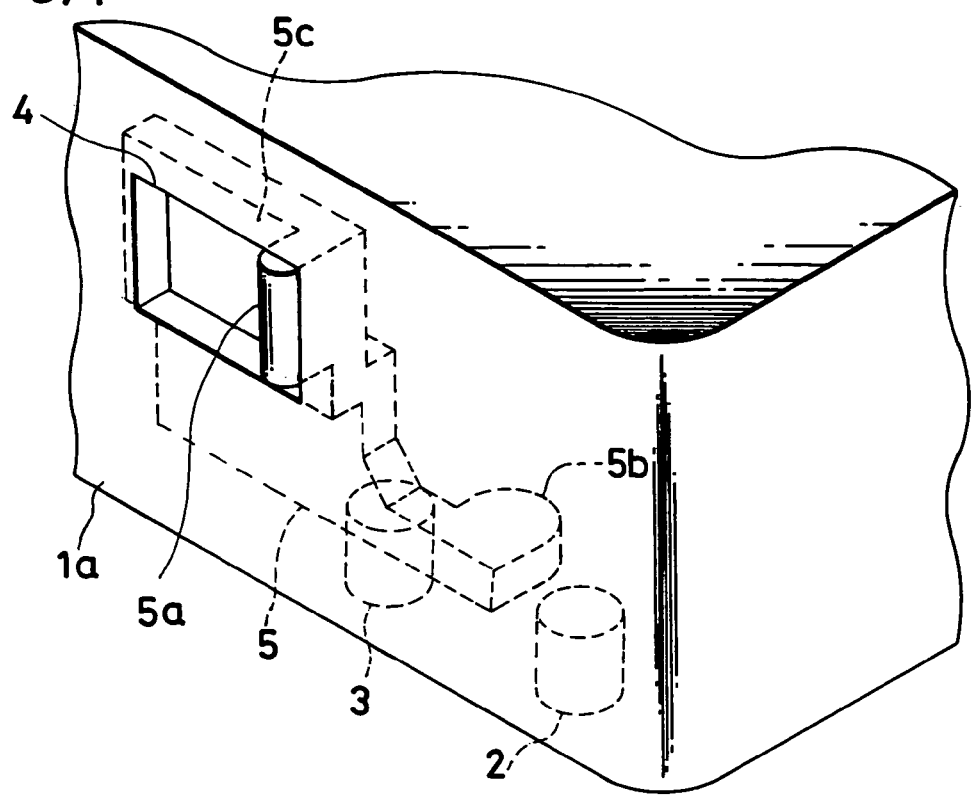

As shown in FIG. 8A, the erroneous erasure prevention member 5 is moved by laying a finger or the like on the lug portion 5a projecting from the inside of the display window 4 on the side surface 1a of the cassette casing so that the display portion 5c is visible in the whole display window 4. At this time, the erroneous erasure prevention hole 3 is not closed by the protruding portion 5b of the erroneous erasure prevention member 5 to become the open state. A position of the erroneous erasure prevention member 5 at this time is a recordable position in which recording of the cassette can be performed.

Figure 8B:
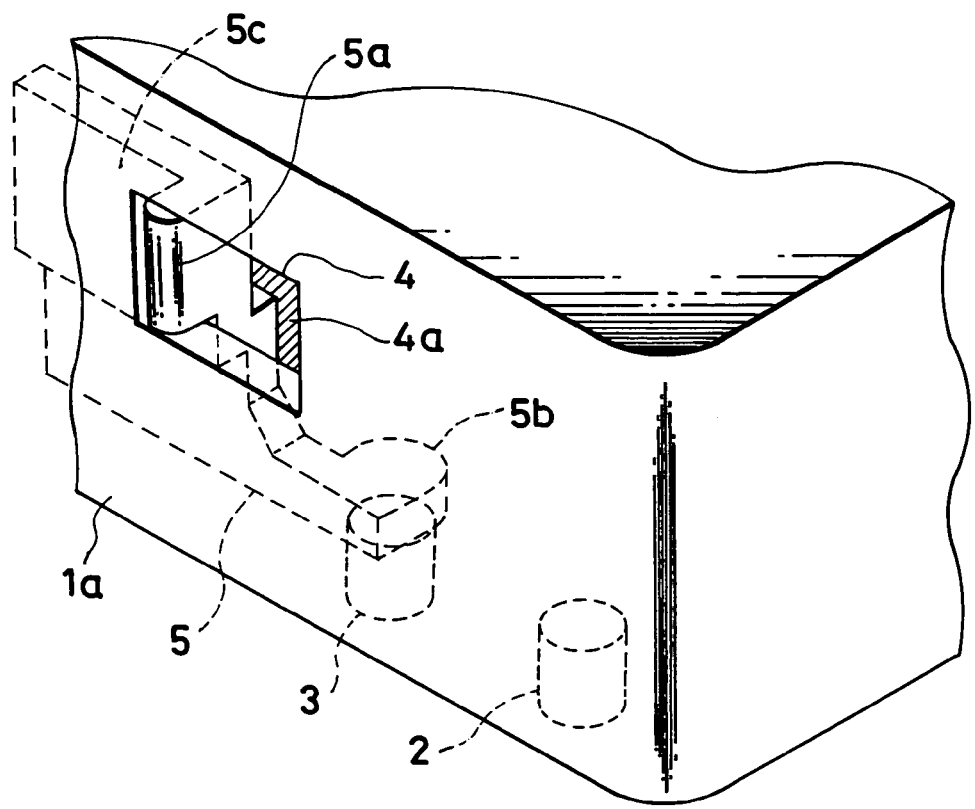

Further, as shown in FIG. 8B, the erroneous erasure prevention member 5 is moved by laying a finger or the like on the lug portion 5a of the erroneous erasure prevention member 5 projecting from the inside of the display window 4 on the side surface 1a of the cassette casing, so that the display portion 5c of the erroneous erasure prevention member 5 disappears from the display window 4 and a recording prohibition display panel 4a disposed behind that member becomes visible. At this time, the erroneous erasure prevention hole 3 becomes the closed state by the protruding portion 5b of the erroneous erasure prevention member 5. A position of the erroneous erasure prevention member 5 at this time is a non-recordable position which prevents the cassette from being recorded.

Figure 9:
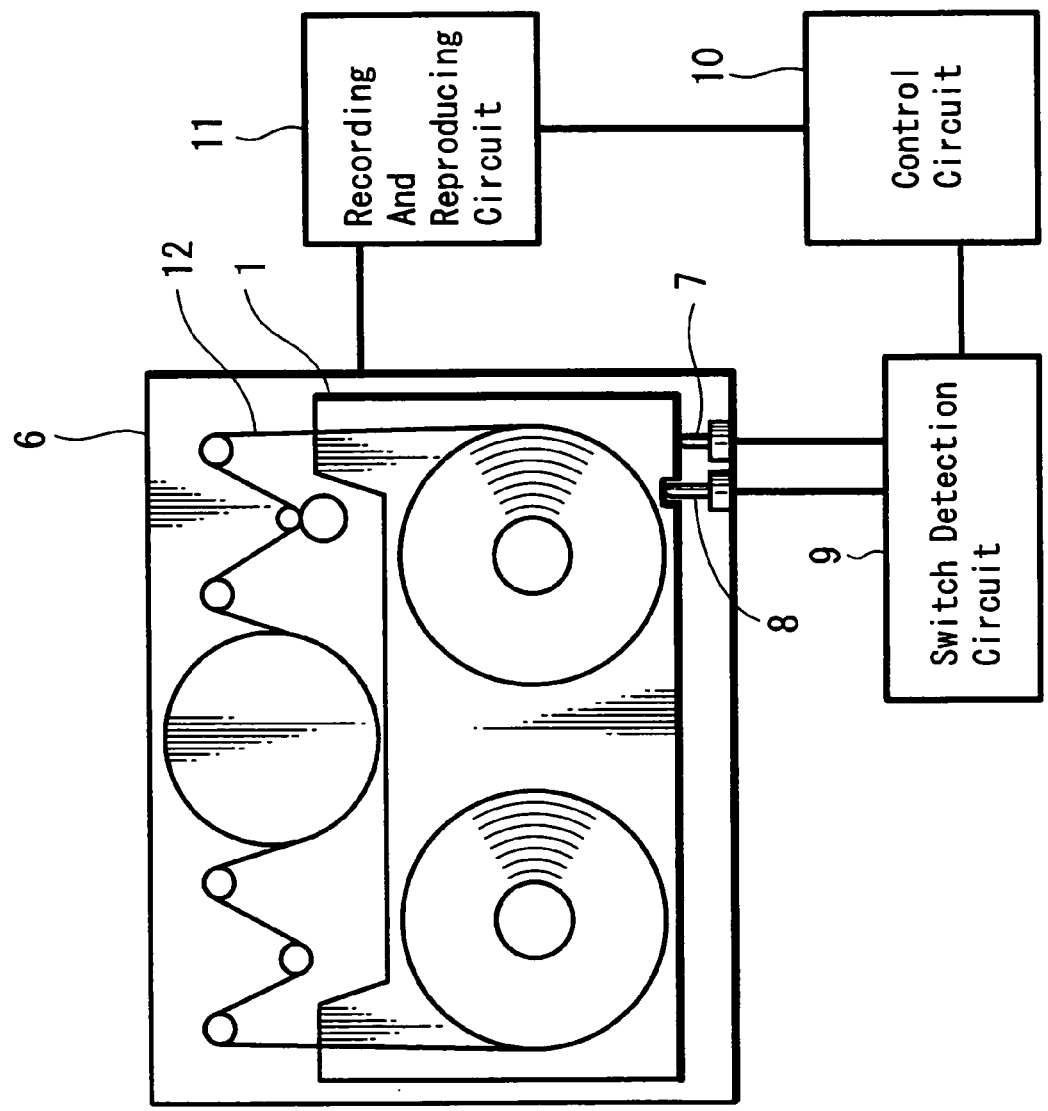
FIG. 9 is a block diagram showing a construction of a recording and reproducing apparatus according to an embodiment of the present invention.

Next, the recording and reproducing apparatus is explained referring to FIGS. 9 through 11.

FIG. 9 is a configuration for performing the erroneous erasure prevention and the identification of the cassette according to this embodiment. The configuration includes a switch detection circuit 9, a control circuit 10 and a recording and reproducing circuit 11, so that a state of the erroneous erasure prevention hole provided in the casing of the cassette 1 can be detected by the existing erroneous erasure prevention detecting switch 7 and the higher erroneous erasure prevention detecting switch 8 which are connected to the switch detection circuit 9.

Further, the switch detection circuit 9 converts a result of the detection performed by the lower and higher erroneous erasure prevention detecting switches 7 and 8 into a predetermined signal to output to the control circuit 10. The control circuit 10 outputs a control command, which controls a recording and reproducing operation based on the output from the switch detection circuit 9, to the recording and reproducing circuit 11. In accordance with the control command from the control circuit 10, the recording and reproducing circuit 11 performs recording on or reproduction from a magnetic tape 12 accommodated in the cassette 1.

Figure 10A:
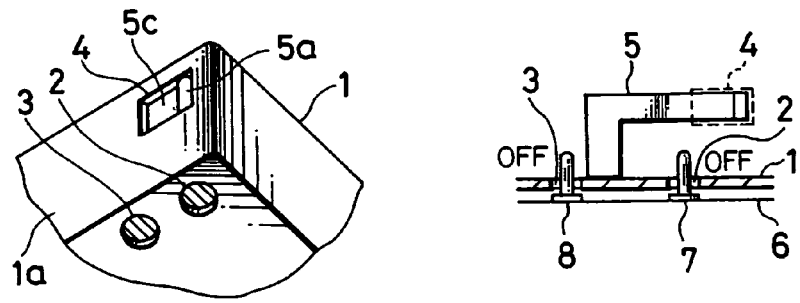
Figure 10B:
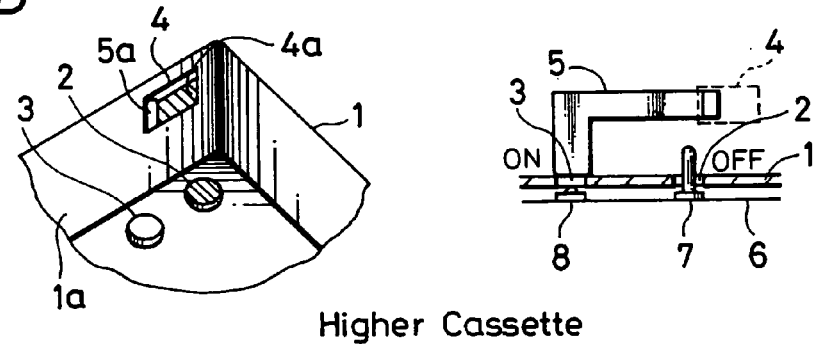
Figure 11A:
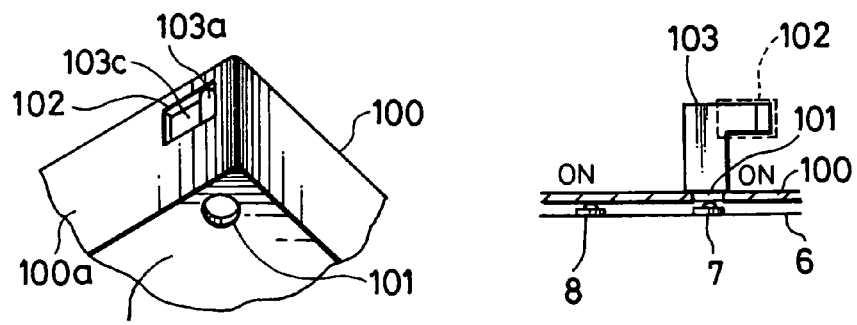
Figure 11B:
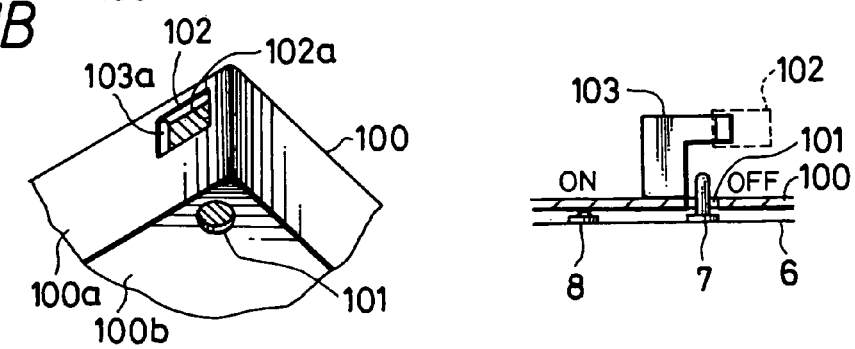

FIGS. 10A and 10B schematically show a relevant part of a cassette and a recording and reproducing apparatus with cross-sectional views, respectively. FIGS. 10A and 10B show open and closed states of an erroneous erasure prevention member and an erroneous erasure prevention hole with respect to a higher cassette at a time when it is recordable and at a time when it is not recordable, respectively; and also, FIGS. 11A and 11B show open and closed states of an erroneous erasure prevention member and an erroneous erasure prevention hole with respect to an existing cassette at a time when it is recordable and at a time when it is not recordable, respectively.

In this embodiment, the existing erroneous erasure prevention hole 2 of the higher cassette 1 is always kept in the open state.

As shown in FIG. 10A, when the erroneous erasure prevention member 5 is moved to the recordable position, the erroneous erasure prevention hole 3 becomes the open state in addition to the existing erroneous erasure prevention hole 2 which has been set in the open state in advance, then both the existing and higher erroneous erasure prevention detecting switches 7 and 8 are turned off. At this time, the higher cassette 1 becomes the recordable state.

Further, when the erroneous erasure prevention member 5 is moved to the non-recordable position as shown in FIG. 10B, the erroneous erasure prevention hole 3 becomes the closed state although the existing erroneous erasure prevention hole 2 has been set in the open state in advance, then the existing erroneous erasure prevention detecting switch 7 is turned off and the higher erroneous erasure prevention detecting switch 8 is turned on. At this time, the higher cassette 1 becomes the non-recordable state.

On the other hand, when the erroneous erasure prevention member 103 is moved to the recordable position as shown in FIG. 11A, the erroneous erasure prevention hole 101 becomes the closed state, then both the existing and higher erroneous erasure prevention detecting switches 7 and 8 are turned on. At this time, the existing cassette 100 becomes the recordable state.

Further, when the erroneous erasure prevention member 103 is moved to the recordable position as shown in FIG. 11B, the erroneous erasure prevention hole 101 becomes the open state, then the existing erroneous erasure prevention detecting switch 7 is turned off and the higher erroneous erasure prevention detecting switch 8 is turned on. At this time, the existing cassette 100 becomes the non-recordable state.

Figure 12:
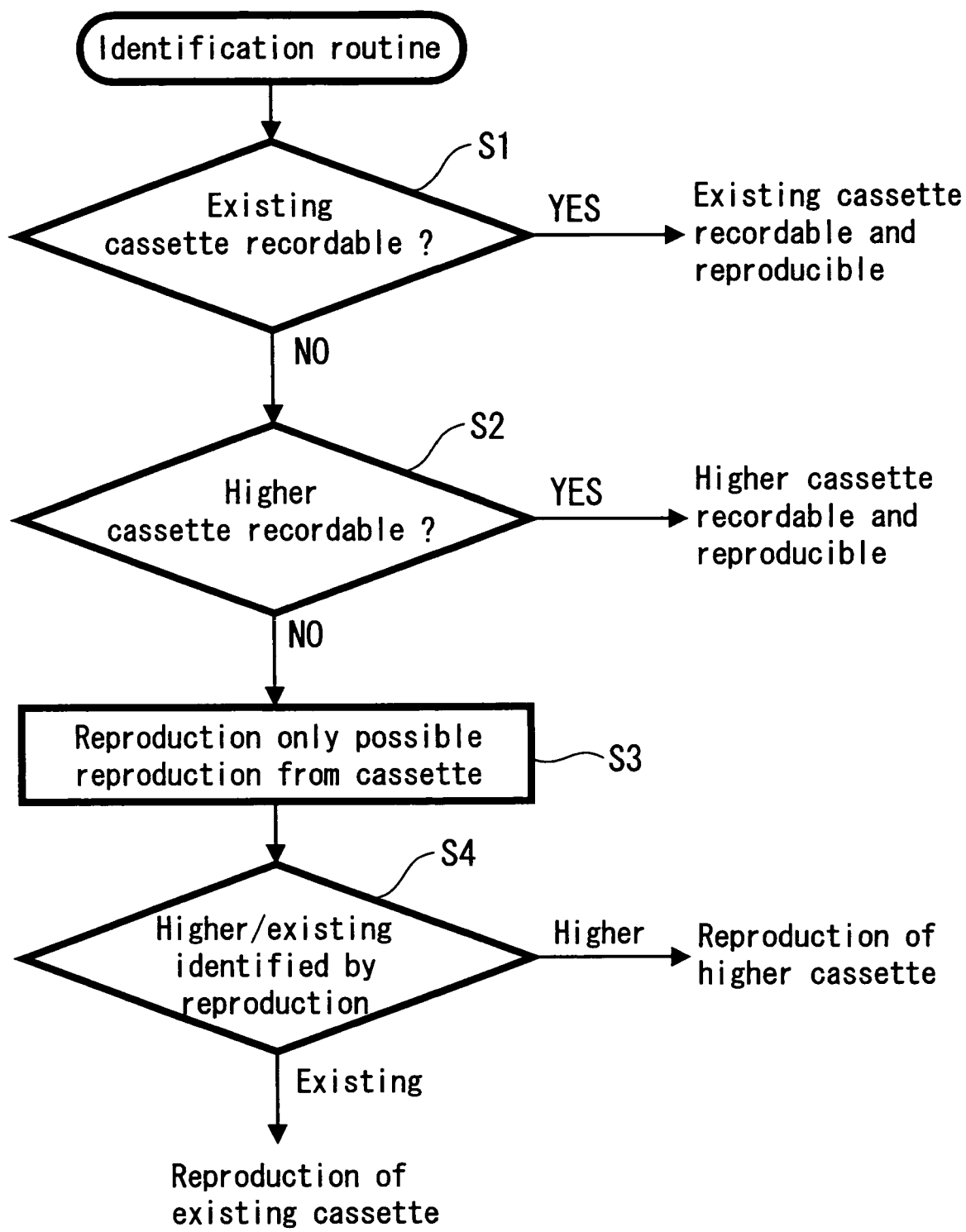
FIG. 12 is a flow chart showing a flow of the processing of erroneous erasure prevention and cassette identification in a recording and reproducing apparatus according to an embodiment of the present invention.

A flow of the erroneous erasure prevention and the format identification of the cassette according to the present invention is explained referring to a flow chart shown in FIG. 12.

First, an existing or a higher cassette is loaded into the VTR and it is judged whether or not the existing cassette is recordable (S1).

Specifically, a state of the loaded cassette is confirmed by the ON/OFF-state of the lower erroneous erasure prevention detecting switch of the VTR. In other words, as shown in FIG. 11A, when the erroneous erasure prevention member 103 is moved to the recordable position and the erroneous erasure prevention hole 101 of the cassette 100 is in the closed state, the existing erroneous erasure prevention detecting switch 7 is depressed to be turned on and therefore, it is judged that the existing cassette 100 is in a recordable state.

At this time, only with this combination, the existing erroneous erasure prevention detecting switch 7 is turned on and the erroneous erasure prevention is cancelled. Accordingly, it is possible to record on and reproduce from the cassette 100 with the existing format.

Then, when the existing cassette is judged to be non-recordable at the step S1, it is judged whether or not the higher cassette is recordable (S2).

As shown in FIG. 10A, when the erroneous erasure prevention member 5 is moved to the recordable position and the erroneous erasure prevention hole 3 of the cassette 1 is in the open state, the higher erroneous erasure prevention detecting switch 8 is not depressed to be in the OFF-state, and therefore, it is judged that the higher cassette 1 is in a recordable state.

At this time, only with this combination, the higher erroneous erasure prevention detecting switch 8 is in the OFF-state, it is possible to record on and reproduce from the cassette 1. Moreover, since the hole 3 for erroneous erasure prevention of the cassette 1 has been set in the open state in advance, there is no possibility that data is erroneously rewritten or deleted with the existing format.

Then, when both the higher cassette and the existing cassette are non-recordable, in other words, when it is only possible to reproduce, the reproduction from the cassette is performed (S3).

As shown in FIGS. 10B and 11B, since it is completely unknown whether the one loaded in the VTR 6 at this time is the existing cassette 100 or the higher cassette 1, it is judged directly from data obtained from the reproduction such as a characteristic of a reproduced signal, for example.

Based on the result of the above described reproduction, it is identified whether the higher cassette or the existing cassette has been loaded (S4).

It is judged whether the recorded data which has been reproduced is of the higher format or of the existing format. As the result of this reproduction, if the recorded data is of the higher format, a reproduction of the higher cassette 1 is performed with the higher format and if the recorded data is of the existing format, a reproduction of the existing cassette 100 is performed with the existing format.

As heretofore described, according to this embodiment, since the identification of the cassette is performed by judging whether it is an existing or a higher format based on the data obtained from the reproduction so that the reproduction can be performed by an appropriate format, it is possible to utilize the existing cassette and the drive apparatus by adding only one piece of higher format erroneous erasure prevention detecting switch 8 to support the higher format.

Further, since the lower erroneous erasure prevention hole 2 of the higher cassette 1 is always kept in the OFF-state, that is, in the erroneous erasure prevention state, there is no possibility that recording is performed erroneously with the existing format with respect to the higher cassette 1.

Figure 13A:
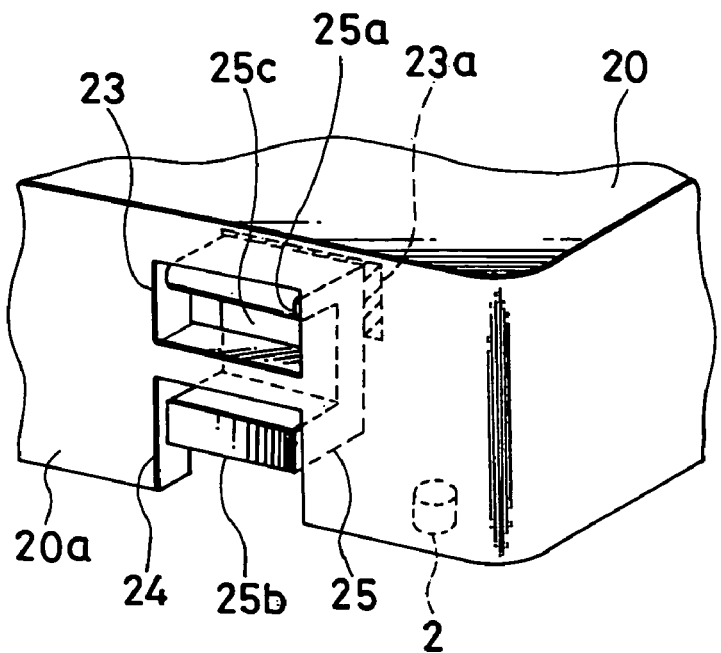
Figure 13B:
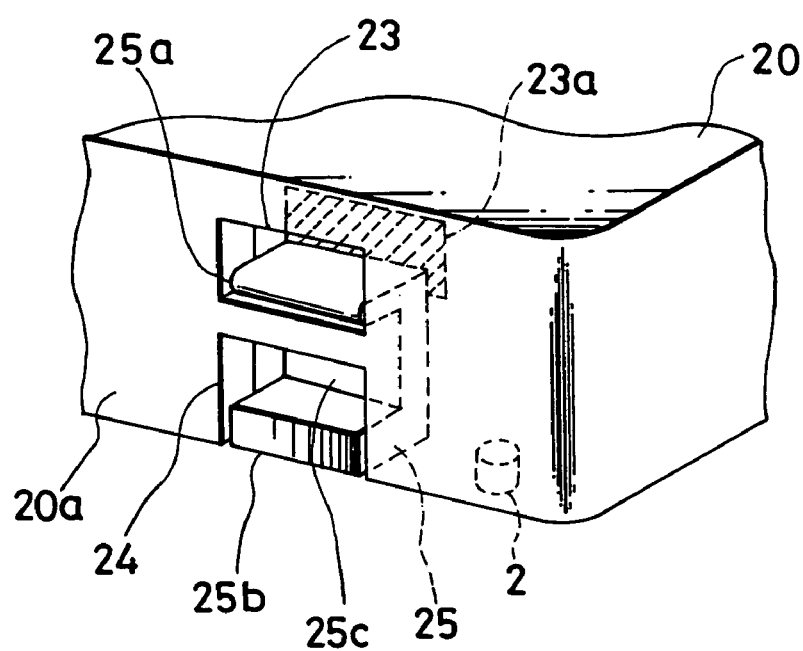
Figure 14A:
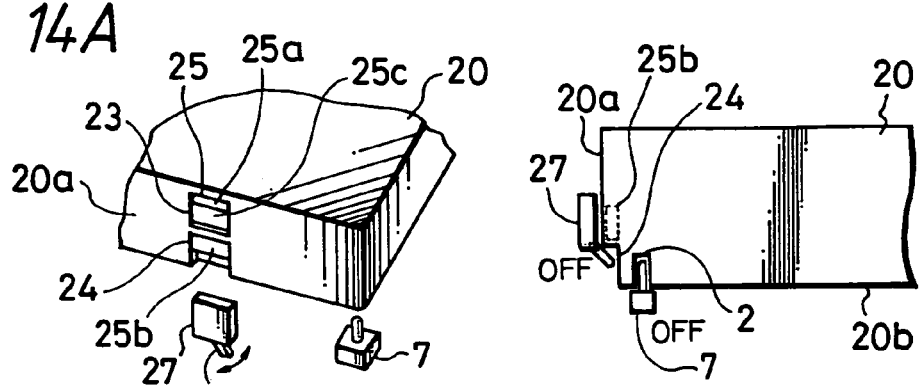
Figure 14B:
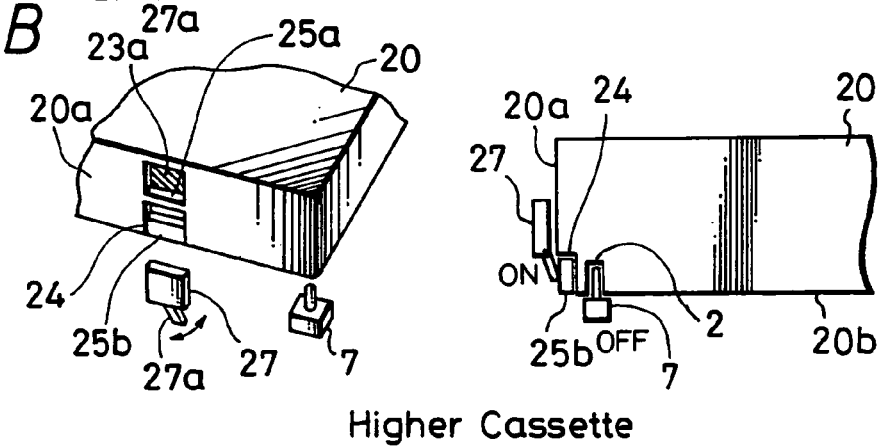
Figure 15A:
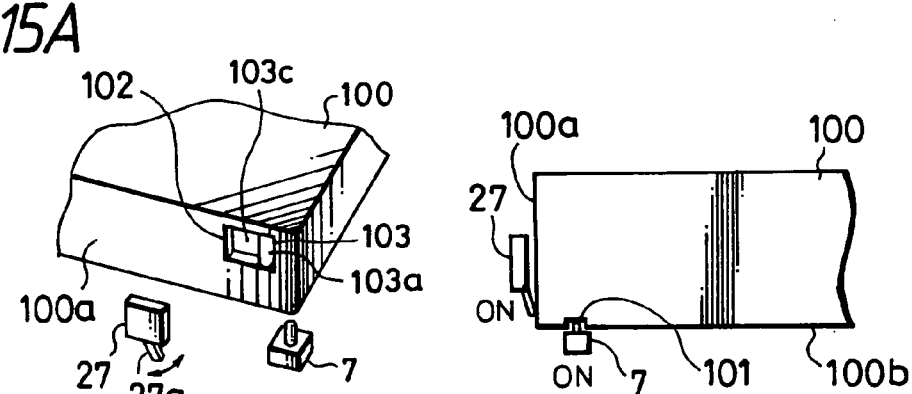
Figure 15B:
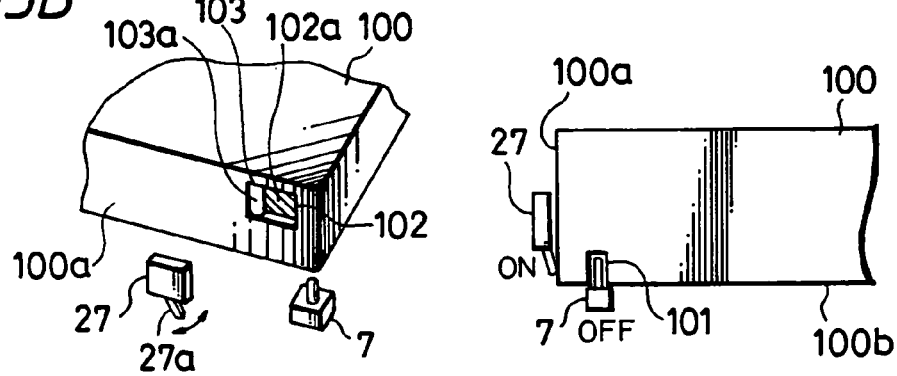

Anther embodiment of a recording and reproducing apparatus according to the present invention is explained referring to FIGS. 13 through 15. FIGS. 13A and 13B schematically show a relevant part of a cassette and a recording and reproducing apparatus with a cross-sectional view. FIGS. 14A and 14B show open and closed states of an erroneous erasure prevention member and an erroneous erasure prevention hole with respect to a higher cassette at a time when it is recordable and at a time when it is not recordable, respectively; and also, FIGS. 15A and 15B show open and closed state of an erroneous erasure prevention member and an erroneous erasure prevention hole with respect to an existing cassette at a time when it is recordable and at a time when it is not recordable, respectively.

In this embodiment, the erroneous erasure prevention member on the side surface of the cassette shown in FIG. 6 is not made to slide in the longitudinal direction, but is made to be capable of sliding in the widthwise direction and also an erroneous erasure prevention detecting switch is made to have a structure corresponding thereto. Further, similarly to the embodiment of FIG. 10, the existing erroneous erasure prevention hole is kept always in the open state with respect to the higher cassette. Other structure than the above is the same as the embodiment of FIG. 10.

In addition, the same reference numerals as those in FIGS. 8, 10 and 11 are given to corresponding portions in FIGS. 13 through 15.

In FIGS. 13A and 13B, a reference numeral 20 denotes a cassette in which a U-shaped erroneous erasure prevention member 25 is slidably provided at a position adjacent to a corner inside a casing in the widthwise direction in the side surface 20a, and also, the existing erroneous erasure prevention hole 2 is provided nearby at a predetermined position on the bottom surface 20b of the cassette.

The erroneous erasure prevention member 25 is structured to be approximately U-shaped having, for example, an upper convex portion 25a to be used for a lug at the time of moving operation and a lower convex portion 25b for depressing the erroneous erasure prevention detecting switch, and both the higher and lower convex portions are disposed to face the outside of the cassette. Further, the erroneous erasure prevention member includes a display portion 25c which indicates that the cassette is recordable through an display window 23 provided by making an opening in the side surface 20a of the cassette casing.

Moreover, a cut-out portion 24 is provided on the side surface 20a of the cassette 20 so that the lower convex portion 25b can be moved. Further, on a recording and reproducing apparatus side (not shown in the figure), the existing erroneous erasure prevention detecting switch 7 and an higher erroneous erasure prevention detecting switch 27 are provided at positions corresponding respectively to the above existing erroneous erasure prevention described hole 2 and erroneous erasure prevention member 25.

As shown in FIG. 14A, a projecting side 27a is provided at the lower end portion of this higher erroneous erasure prevention detecting switch 27. When the higher erroneous erasure prevention detecting switch 27 is in the OFF-state, the projecting side 27a is forced upward to become a rotated state to be nearly level having a center of rotation at a connecting point to the higher erroneous erasure prevention detecting switch 27. Then, when the projecting side 27a is brought in contact with the erroneous erasure prevention member 25 described later on, the projecting side 27a is pushed to move downward to turn on the higher erroneous erasure prevention detecting switch 27.

Further, when the cassette 20 is loaded into the VTR, the open or closed state of the existing erroneous erasure prevention hole 2 and the position of the erroneous erasure prevention member 25 are respectively detected by the existing erroneous erasure prevention detecting switch 7 and the higher erroneous erasure prevention detecting switch 27 which are provided respectively at the positions corresponding to the above described existing erroneous erasure prevention hole 2 and higher erroneous erasure prevention cut-out portion 24 on the VTR side.

As shown in FIG. 14A, when the erroneous erasure prevention member 25 is moved by laying a finger or the like on the lug portion 25a in the widthwise direction on the side surface 20a, so that the display portion 25c becomes visible from the display window 23, the lower convex portion 25b does not depress the projecting side 27a of the higher erroneous erasure prevention detecting switch 27 and the projecting side 27a is forced upward to turn off the higher erroneous erasure prevention detecting switch 27. At this time, the higher cassette 20 becomes the recordable state.

Further, as shown in FIG. 14B, when the erroneous erasure prevention member 25 is moved so that the recording prohibition display panel 23a can be shown in the display window 23, the lower convex portion 25b is brought in contact with the projecting side 27a of the higher erroneous erasure prevention detecting switch 27 to turn on the higher erroneous erasure prevention detecting switch 27. At this time, the higher cassette 20 becomes the non-recordable state.

On the other hand, when the existing cassette 100 is loaded into the recording and reproducing apparatus of this embodiment and when the erroneous erasure prevention member 103 is moved by laying a finger or the like on the lug portion 103a to move in the longitudinal direction of the side surface 100a so that the display portion 103c becomes visible from the display window 102 as shown in FIG. 15A, the existing erroneous erasure prevention hole 101 on the bottom surface 100b of the cassette casing is closed to turn on the existing erroneous erasure prevention detecting switch 7. The higher erroneous erasure prevention detecting switch 27 is turned on since the projecting side 27a is pressed by the side surface 100a. At this time, the existing cassette 100 becomes the recordable state.

Moreover, as shown in FIG. 15B, when the erroneous erasure prevention member 103 is moved so that the recording prohibition display panel 102a can be shown in the display window 102, the existing erroneous erasure prevention hole 101 on the bottom surface 100b of the cassette casing becomes open to turn off the existing erroneous erasure prevention detecting switch 7. The higher erroneous erasure prevention detecting switch 27 is being turned on since the projecting side 27a is pressed by the side surface 100a. At this time, the existing cassette 100 becomes the non-recordable state.

Similarly to the embodiment of FIG. 6, the flow of the erroneous erasure prevention and the identification of the existing and higher cassettes is performed as shown in the flow chart of FIG. 12 also in this embodiment of FIG. 13.

Since this embodiment has a structure as described above, it can be easily understood that an operational effectiveness similar to that of the embodiment of FIG. 8 can be obtained.

Figure 16A:
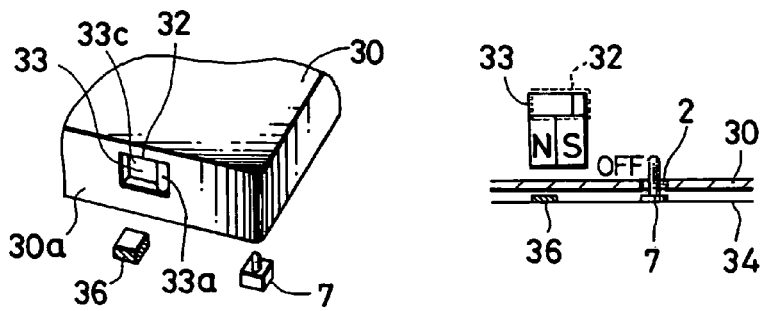
Figure 16B:
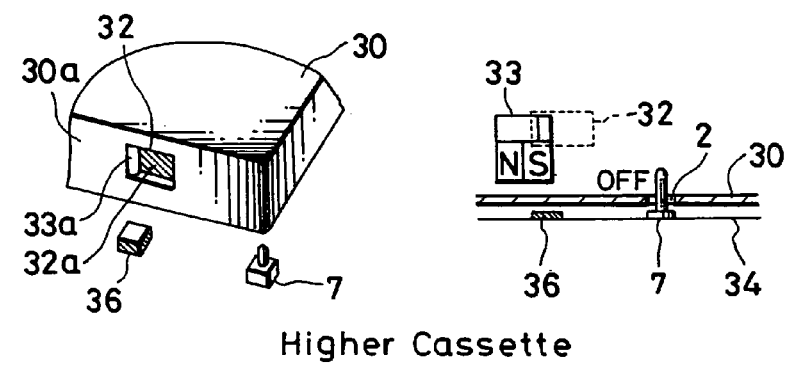
Figure 17A:
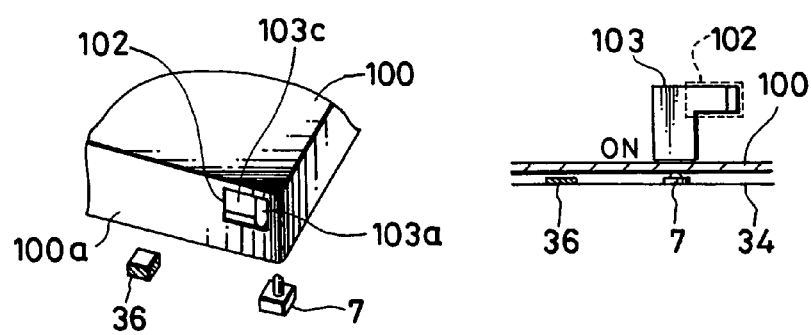
Figure 17B:
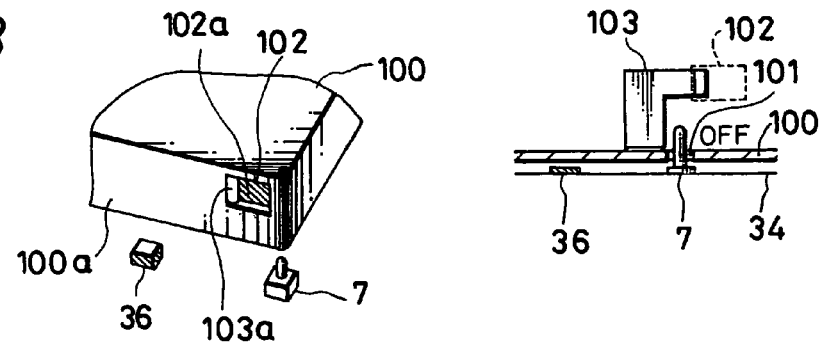

Next, further another embodiment of a recording and reproducing apparatus according to the present invention is explained referring to FIGS. 16 and 17. FIGS. 16A and 16B show open and closed states of an erroneous erasure prevention member and an erroneous erasure prevention hole with respect to a higher cassette at a time when it is recordable and at a time when it is not recordable, respectively; and also, FIGS. 17A and 17B show open and closed states of an erroneous erasure prevention member and an erroneous erasure prevention hole with respect to an existing cassette at a time when it is recordable and at a time when it is not recordable, respectively.

In this embodiment, so-called a plastic-magnet, for example, which is made of a magnetized plastic is used instead of the erroneous erasure prevention member 5 on the side surface of the higher cassette shown in FIG. 6, and also, a hall element, for example, is used as an higher erroneous erasure prevention detecting switch 36. Moreover, similarly to the embodiment of FIG. 5, the existing erroneous erasure prevention hole is also always kept in the open state with respect to the higher cassette in this embodiment.

In addition, in FIG. 16 and FIG. 17, the same reference numerals are given to those corresponding to the ones in FIGS. 10 and 11, and the other structure is made to be the same as the embodiment of FIG. 6.

As described above, as shown in FIGS. 16A and 16B, an higher cassette 30 is provided with a slidable erroneous erasure prevention member 33 made of, for example, the plastic-magnet at a position adjacent to a corner inside the cassette casing in the longitudinal direction, and also, the existing erroneous erasure prevention hole 2 is provided at a predetermined position on the bottom surface of the cassette. Further, in a drive unit of a VTR 34, the existing erroneous erasure prevention detecting switch 7 and the higher erroneous erasure prevention detecting switch 36 made of a hall element are provided at positions corresponding respectively to the above described existing erroneous erasure prevention hole 2 and higher erroneous erasure prevention member 33.

The hall element constituting the higher erroneous erasure prevention detecting switch 36 has polarities of the S-pole and the N-pole and is disposed in the vicinity of the plastic-magnet constituting the erroneous erasure prevention member 33 with the cassette casing in between. When this plastic-magnet is moved, the polarity changes in a portion close to the hall element and its resultant alteration of a magnetic field is detected from an alteration of an electromotive force generated in the hall element. Accordingly, a position of the erroneous erasure prevention member 33 made of this plastic-magnet is detected to identify a state of the cassette 30.

In this embodiment, the cassette is set to the recordable state when the N-pole of the plastic-magnet comes close to the hall element, for example, and is set to the non-recordable state when the S-pole of the plastic-magnet comes close to the hall element. Further, when the magnetic field does not exist in the vicinity of the plastic-magnet, it is made to be non-recordable.

In the higher cassette 30 of this embodiment, when the plastic-magnet constituting the erroneous erasure prevention member 33 is moved by laying a finger or the like on a lug portion 33a in the longitudinal direction on the side surface 30a so that an display portion 33c of the erroneous erasure prevention member 33 becomes visible from the display window 32 as shown in FIG. 16A, the existing erroneous erasure prevention hole 2 has been set in the open state in advance, and also, the N-pole of the plastic-magnet is brought close to the hall element constituting the higher erroneous erasure prevention detecting switch 36. At this time, the higher cassette 30 becomes the recordable state.

Further, as shown in FIG. 16B, when the erroneous erasure prevention member 33 is moved so that the recording prohibition display panel 32a can be shown in the display window 32, the existing erroneous erasure prevention hole 2 has been set to the open state in advance, and also, the S-pole of the plastic-magnet comes close to the hall element of the higher erroneous erasure prevention detecting switch 36. At this time, the higher cassette becomes the non-recordable state.

Further, in the existing cassette 100 provided with the erroneous erasure prevention member 103 for the existing format, when the erroneous erasure prevention member 103 is moved by laying a finger or the like on the lug portion 103a in the longitudinal direction on the side surface 100a so that the display portion 103c is visible from the display window 102 as shown in FIG. 17A, the erroneous erasure prevention hole 101 becomes the closed state. At this time, the existing erroneous erasure prevention detecting switch 7 turns on, and there is no magnetic field generated in the vicinity of the higher erroneous erasure prevention detecting switch 36 made of the hall element. Accordingly, the existing cassette 100 becomes the recordable state.

Moreover, as shown in FIG. 17B, when the erroneous erasure prevention member 103 is moved so that the recording prohibition display panel 102a can be shown in the display window 102, the erroneous erasure prevention hole 101 becomes the open state. At this time, the existing erroneous erasure prevention detecting switch 7 turns off, and there is no magnetic field generated in the vicinity of the higher erroneous erasure prevention detecting switch 36 made of the hall element. Accordingly, the existing cassette 100 becomes the non-recordable state.

Similarly to the embodiment of FIGS. 10 and 11, the flow of the erroneous erasure prevention and the format identification of the cassette is also performed in accordance with the flow chart shown in FIG. 12 in this embodiment of FIGS. 16 and 17.

According to this embodiment, since the higher erroneous erasure prevention member 33 is made of the plastic-magnet and also the higher erroneous erasure prevention detecting switch 36 is made of the hall element, the higher erroneous erasure prevention means can be made a non-contact detection method, and therefore, a mechanical loss can be eliminated.

Moreover, since this embodiment has a structure as described above, it can be easily understood that other operational effectiveness similar to that of the embodiment shown in FIG. 6 can be obtained.

Figure 18:
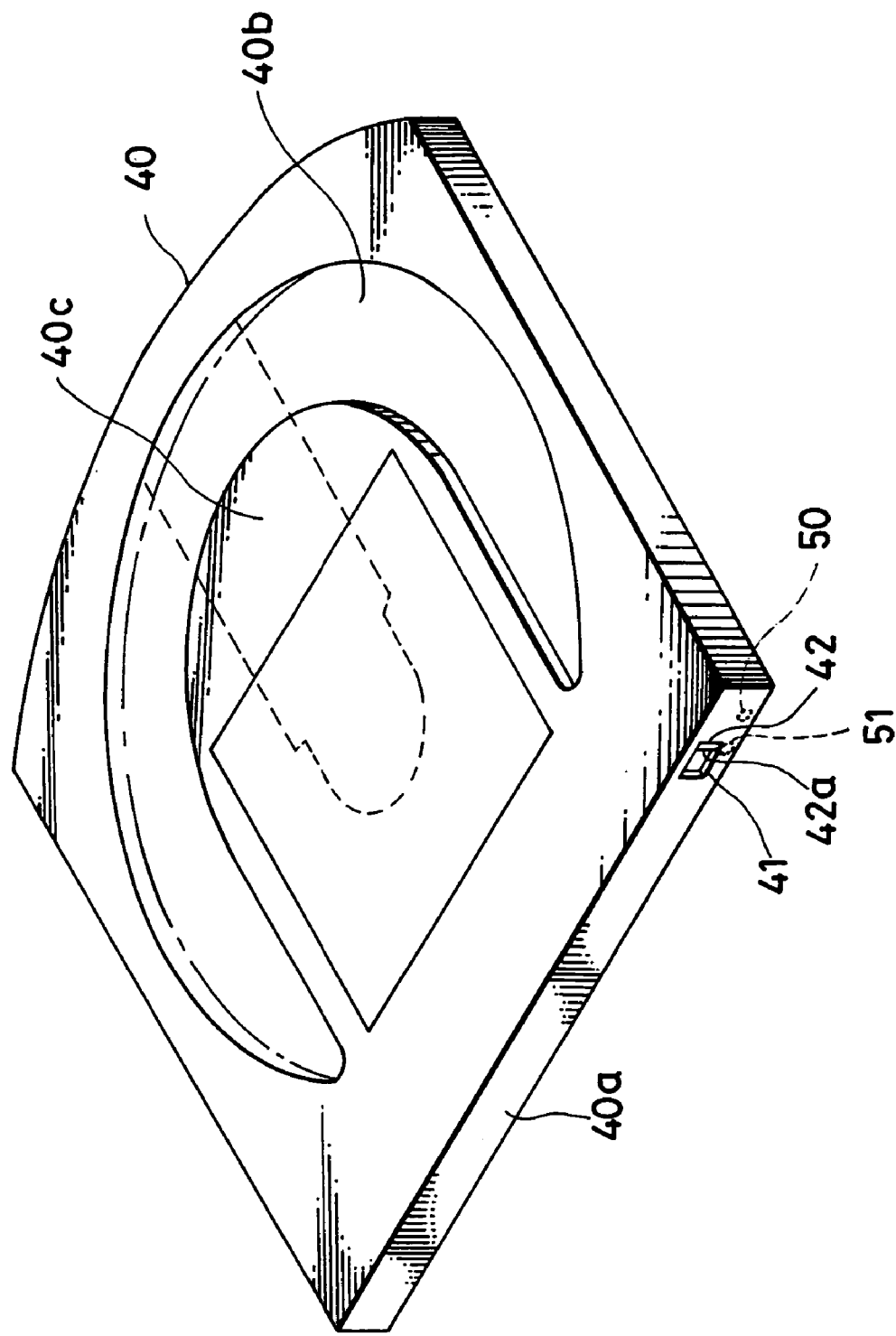
FIG. 18 is a perspective view showing another embodiment of the present invention.
Figure 19:
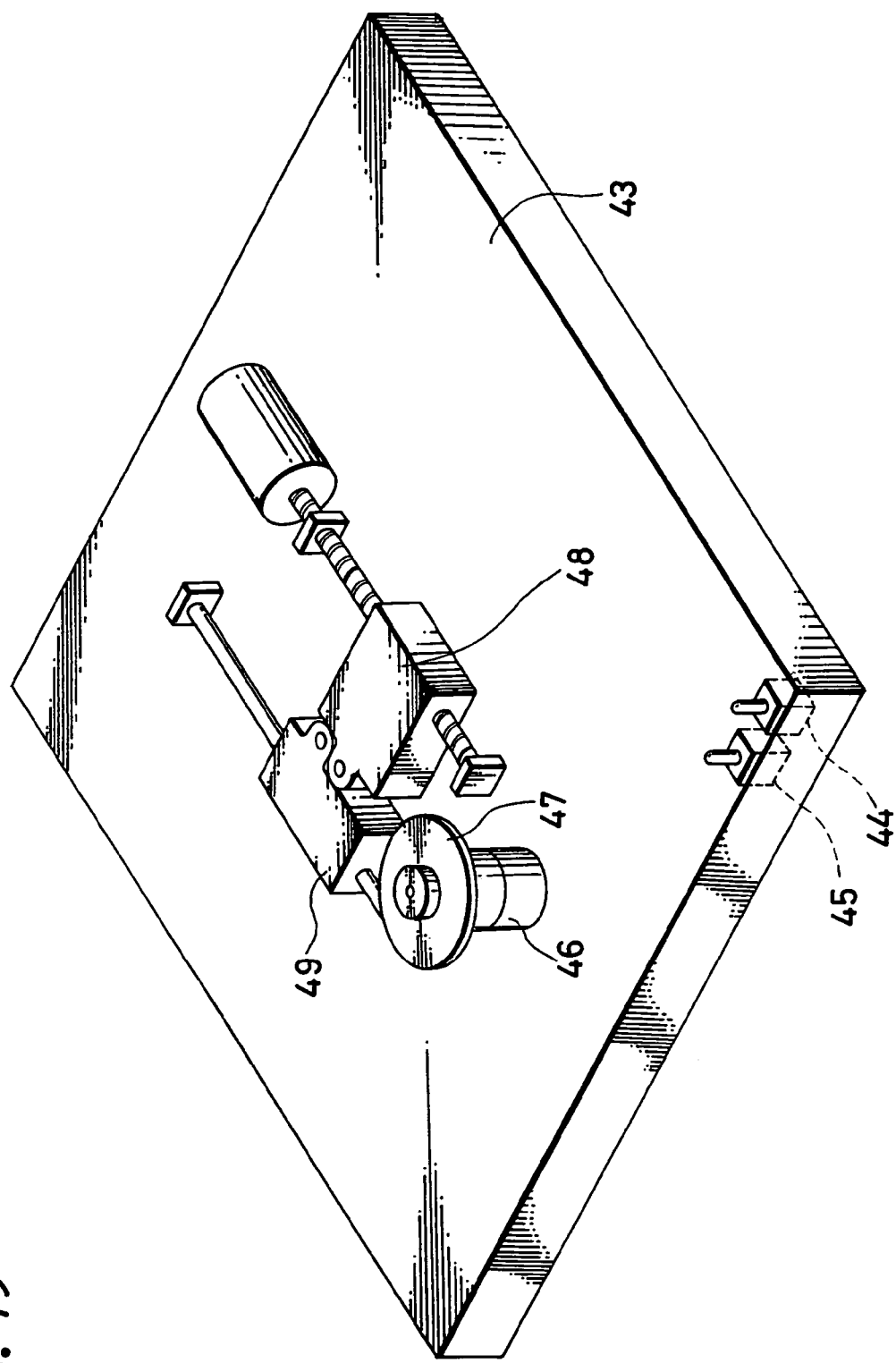
FIG. 19 is a perspective view showing another embodiment of the present invention.

Another embodiment of a recording and reproducing apparatus according to the present invention is explained referring to FIGS. 18 and 19. In this embodiment, the cassette shown in FIG. 6 is applied to a disc cartridge of a disc type recording medium such as, for example, an optical disc. FIG. 18 is a perspective view showing, for example, an example of a DVR disc cartridge, and also, FIG. 19 is a perspective view showing an example of a recording and reproducing apparatus to which the above mentioned DVR disc cartridge is loaded.

In the DVR disc cartridge, recording and reproduction is performed on a disc using a blue color or blue-violet color laser, and the DVR cartridge is placed in a higher order than a DVD disc cartridge which uses a red color laser.

For example, similarly to the embodiment of FIG. 6, an erroneous erasure prevention member 42 is arranged, for example, at a position adjacent to a corner inside a DVR disc cartridge casing 40, and also, a lower erroneous erasure prevention hole 50 and a higher erroneous erasure prevention hole 51 are respectively provided on the bottom surface of the cartridge. An display window 41 is provided on a side surface 40a of the casing so that a moving operation can be performed by laying a finger or the like on a lug portion 42a. A reference numeral 40b denotes a see-through window and a portion indicated by a dotted line denotes an opening portion 40c having a shutter provided on the bottom surface, in which while a DVR disc is loaded, the opening portion 40c opens and the DVR disc is irradiated with a laser beam from a pickup described later on, so that recording and reproduction of a signal can be performed.

In FIG. 19, a reference numeral 43 denotes an example of a chassis of a recording and reproducing apparatus for a DVR, in which a disc mounted on a turntable 47 is rotated by a spindle motor 46 and a signal is recorded and reproduced by pickups 48 and 49. Those pickups 48 and 49 respectively emit, for example, a red laser which has been used conventionally and a blue or blue-violet laser which has a shorter wavelength to realize high density recording to perform recording and reproduction of a signal from a DVR disc cartridge and a DVD disc cartridge and to perform reproduction from a playback-only DVD disc.

Further, an existing erroneous erasure prevention detecting switch 44 and a higher erroneous erasure prevention detecting switch 45 are arranged at positions corresponding respectively to the existing erroneous erasure prevention hole 50 and the higher erroneous erasure prevention hole 51 which are located in the vicinity of a corner of the chassis 43 when the disc cartridge 40 is loaded into the recording and reproducing apparatus.

Similarly to the recording and reproducing apparatus shown in FIG. 6, the erroneous erasure prevention and the format identification of the signal of the DVR disc or the DVD disc accommodated in the disc cartridge can be performed in accordance with the flow chart shown in FIG. 12 by those existing erroneous erasure prevention detecting switch 44 and higher erroneous erasure prevention detecting switch 45.

Since this embodiment has a structure as described above, it can be easily understood that an operational effectiveness similar to that of the embodiment shown in FIG. 6 can be obtained.

In addition, although the explanation is made in this embodiment to the cartridge in which an optical disc such as the DVR disc cartridge or the DVD disc cartridge is accommodated, it is obvious that the application is not limited to the above but the application is also possible to a cartridge which has another recording method such as a magneto-optical disc or a magnetic disc.

According to the present invention, it may also be considered to perform the erroneous erasure prevention and the identification of a cassette by making the structure of an erroneous erasure prevention detecting switch optical, for example, to detect transmitted light from a detection hole provided on a cassette side. Further, in a MPEG method which is a compression coding technology of a moving picture, the present invention can be applied to perform the identification of cassettes of various formats such as the format identification of recording media recorded in different MPEG method formats.

Moreover, when a further higher format is developed, it is also possible to perform the erroneous erasure prevention and the format identification of three kinds of cassette by further adding a detection hole of a cassette to have three holes, for example.

Furthermore, the recording medium cassette according to the present invention is not limited to the cassette incorporating a recordable and reproducible tape or the cartridge incorporating recordable and reproducible disc which have been explained in the above embodiments; and it is obvious that the present invention is also applicable to a recording medium package in a block or card shape, in which an erroneous erasure prevention means is included and a recording medium such as a hard disc drive, a semiconductor memory and a hologram memory is incorporated.

It should be noted that it is needless to say the present invention is not limited to the above described embodiments, and other various structures can be obtained without departing from the scope and spirit of the present invention.

INDUSTRIAL APPLICABILITY

AS described above, since an existing cassette and an existing drive unit can be utilized, there are advantages of improving the design efficiency and of developing a higher format with a small modification, that is, at low cost.

Further, since a higher format can be supported only by adding one piece of detecting switch to an existing drive unit, there are advantages of improving the design efficiency with a small modification, that is, at low cost and of saving a space for the mechanism.

Furthermore in the present invention, when the erroneous erasure prevention means is composed of a magnetized member having a polarity and the erroneous erasure prevention is performed by detecting the alteration of the magnetic field generated by the member, a non-contact detection method can be obtained and there is an advantage of eliminating a mechanical loss.

Moreover, according to the present invention, the identification of a cassette can be performed by adding only one detection hole, because one detection hole is used in common for detecting whether the cassette is of a new format or of an existing format and for preventing the erroneous erasure by utilizing the fact that the cassette at the time when the detection hole for the new format is in the closed state and the cassette for the existing format which does not have the detection hole are detected as if they were in the same state when viewed from the drive unit side.

The invention claimed is:

1. A recording and reproducing apparatus in which recording and reproduction from an existing format cassette having an existing erroneous erasure prevention means for preventing erroneous erasure of data recorded with an existing format is performed and recording and reproduction of a new format cassette having a first erroneous erasure prevention means at a position corresponding to the position of said existing erroneous erasure prevention means and having a second erroneous erasure prevention means for preventing erroneous erasure of data recorded with a new format is performed, wherein when reproduction is performed, whether the cassette is the existing format cassette or the new format cassette is judged based on data obtained from the reproduction of the existing format and new format cassettes to perform reproduction.

2. The recording and reproducing apparatus according to claim 1, wherein in said new format cassette, the first erroneous erasure prevention means is always kept in a state of preventing the erroneous erasure.

3. The recording and reproducing apparatus according to claim 1, wherein said first and second erroneous erasure prevention means are formed of detection holes to perform the erroneous erasure prevention by detecting an open or closed state of the detection holes.

4. The recording and reproducing apparatus according to claim 3, further comprising a control circuit in which when it is detected that the detection hole of said first erroneous erasure prevention means is in a closed state, it is judged that a loaded cassette is the cassette of the existing format to be in a recordable state; when it is detected that the detection hole of said first erroneous erasure prevention means is in an open state and the detection hole of said second erroneous erasure prevention means is in an open state, it is judged that a loaded cassette is the cassette of the new format to be in a recordable state; and when it is detected that the detection hole of said first erroneous erasure prevention means is in an open state and the detection hole of said second erroneous erasure prevention means is in a closed state, it is judged that a loaded cassette is the cassette of the existing format or the new format to be in a non-recordable state.

5. The recording and reproducing apparatus according to claim 4, further comprising a control circuit in which when it is detected that the detection hole of said first erroneous erasure prevention means is in the open state and the detection hole of said second erroneous erasure prevention means is in the closed state, the reproduction is performed to judge whether the cassette is of the existing format or the new format.

6. The recording and reproducing apparatus according to claim 1, wherein said second erroneous erasure prevention means is composed of a magnetized member having a polarity to perform the erroneous erasure prevention by detecting an alteration of a magnetic field generated by said member.

* * * * *